United States Patent Office 3,427,328
Patented Feb. 11, 1969

3,427,328
ODORANTS OF THE AMBER TYPE AND PROCESS FOR THE MANUFACTURE THEREOF
Wilhelm Sandermann and Klaus Bruns, Reinbek, Bezirk Hamburg, Germany, assignors to Givaudan Corporation, Delawanna, N.J., a corporation of New Jersey
No Drawing. Filed Aug. 17, 1965, Ser. No. 480,471
Claims priority, application Germany, Aug. 27, 1964, S 92,847
U.S. Cl. 260—340.9                1 Claim
Int. Cl. C07d 7/18, 13/07; C11b 9/00

ABSTRACT OF THE DISCLOSURE

New chemical compounds having amber-type odors are disclosed.

The new odorants may be represented by the structural formulae:

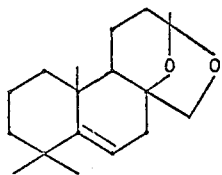 and 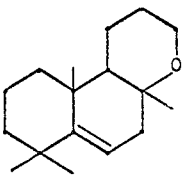

Detailed examples for preparing these compounds, as well as intermediates therefor, are given.

---

The present invention is concerned with novel amber-type odorants, a process for the manufacture thereof and the conversion thereof into further amber-type odorants.

The novel amber-type odorants are the Formulas XIV and XV:

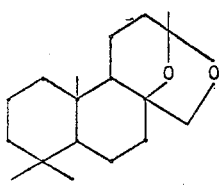         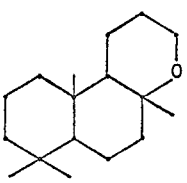

(XIV)                       (XV)

The further odorants referred to above are of the Formulas XVI and XVII:

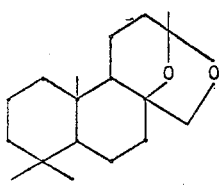         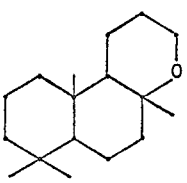

(XVI)                       (XVII)

These further odorants XVI and XVII are derivable from the novel odorants XIV and XV, respectively, by hydrogenating the 5,6-double bond of the latter compounds. As far as they are known, these further odorants have mainly been obtained starting from the relatively inaccessible, and accordingly costly, manool of the formula

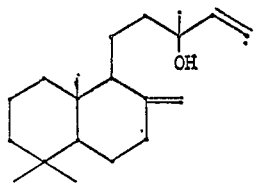

(I)

and sklareol of the formula

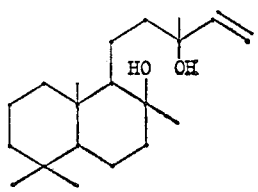

(II)

(cf., for example, Parfümerie und Kosmetik 1959, 40, 129).

According to the process provided by the invention, the novel amber-type odorants XIV and XV are manufactured by converting the 8-methylidene group and the 9-hydroxyalkenyl group, together with the carbon atoms 8 and 9 to which they are attached, of a 4,4,10-trimethyl-decahydronaphthalene derivative of the Formula V

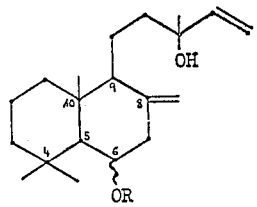

(V)

wherein R represents a hydrogen atom or the acetyl group, according to methods known per se into one of the odoriphoric groups

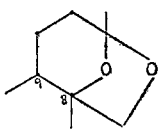 or 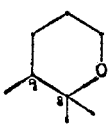

(III)                       (IV)

and then removing the hydroxy or acetoxy group OR with concomitant introduction of a 5,6-double bond.

The naphthalene derivative of Formula V, which may be named larixol (R=hydrogen) or larixyl acetate (R=acetyl), can be readily obtained from the resin of larch. Larixol occurs in larch balsam in a percentage of 30% and more (see Angewandte Chemie, 1947, 59, 248; Chemische Berichte, 1960, 93, 2625; Bull. Soc. Chim. France 1961, 1490) and can be readily obtained therefrom in crystalline form.

As mentioned earlier, the conversion of the 8-methylidene and 9-hydroxy-alkenyl group, together with the carbon atoms to which they are attached, of the starting material of Formula V into one of the odoriphoric groups formulated hereinbefore is carried out according to methods known per se and it will be appreciated that this term means methods in actual use for or described in the literature on the conversion of adjacent methylidene and hydroxy-alkenyl groups and the carbon atoms to which they are attached into one of said odoriphoric groups. Thus, for example, the conversion can be carried out according to one of the following methods:

(a) Conversion into the ordoriphoric group of Formula III hereinbefore: by treatment of larixol (e.g. in acetone solution) with an oxidising agent (particularly potassium permanganate) at a temperature of from about 0°–5° C., there is obtained an oxidation mixture which may be split into an acidic and a neutral portion. A hydroxy methyl ketone of the formula

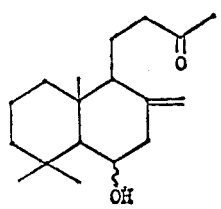

(VI)

can be isolated from the neutral portion (for example, using Girard reagent T). After separation of the ketone fraction, an internal ketal of the formula

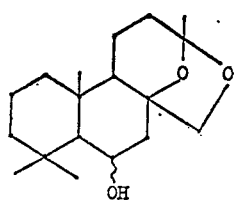

(VII)

can be obtained from the remaining non-ketonic neutral portions (e.g. by chromatography on silicagel). It will be appreciated that Formula VII not only includes the stereoisomer of the configuration shown in Formula VIIa but also the stereoisomer of the configuration shown in Formula VIIb

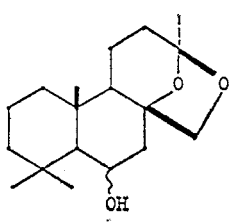 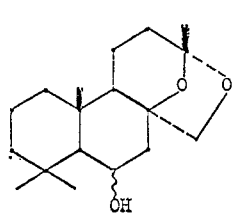

(VIIa) (VIIb)

The internal ketal of Formula VII can also be obtained from larixol as follows:

Larixol is first converted into an oxido-diol of the formula

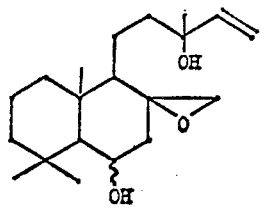

(VIII)

by treatment with an organic peracid (e.g. with peracetic acid, perbenzoic acid or perphthalic acid). It will be appreciated that Formula VIII includes both the stereoisomeric oxido-diols of the configurations shown in Formulae VIIIa (8α,20-oxido isomer) and VIIIb (8β,20-oxido isomer)

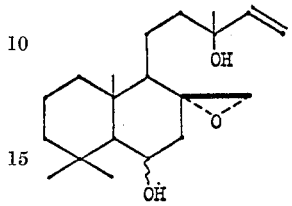 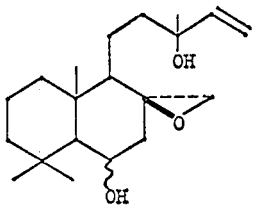

(VIIIa) (VIIIb)

The epoxidation is preferably carried out using perbenzoic acid; for example, in chloroform solution at temperatures around 0° C. The course of the epoxidation can be followed by titration of samples of the solution. After the uptake of one equivalent of acid, the excess peracid can be decomposed (for example, by adding aqueous potassium iodide solution). The oxido-diol of Formula VIII can be converted into the internal ketal of Formula VII by means of ozone; for example, as follows: A solution of the oxido-diol of Formula VIII in carbon tetrachloride or low-boiling petroleum ether is subjected to ozonolysis at approximately 0° C. The mixture is then hydrolysed, conveniently using sodium hydrogen carbonate at approximately room temperature for about 24 hours. The hydrolysis product obtained can then be converted in the presence of an acidic catalyst (for example, p-toluene-sulfonic acid in boiling benzene solution) into the internal ketal VII.

The oxido-diol VIII can also be converted into the internal ketal of Formula VII via an oxido-ketone of the formula

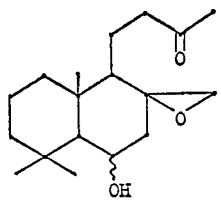

(IX)

for example, as follows:

By treatment with osmium (VIII) oxide and subsequently with periodic acid, or by means of sodium metaperiodate in the presence of a catalytic quantity of osmium (VIII) oxide, the side-chain of the oxido-diol VIII can be degraded to the methyl ketone side-chain. The ketal VII is finally obtained by intermolecular ketalisation (e.g. by heating the oxido-ketone in benzene solution with p-toluene-sulfonic acid).

The oxido hydroxy ketone IX can also be obtained from the hydroxy ketone VI by treatment of the latter compound with a peracid.

(b) Conversion into the odoriphoric group of Formula IV hereinbefore: larixol is first converted into the methyl ketone VI by oxidative degradation of the side-chain. The methyl ketone grouping of the side-chain can then be transformed into a carboxyl group by means of haloform degradation. Thus, the methyl ketone VI can be converted (e.g. by treatment with potassium iodide and iodine in alkaline solution at room temperature) into the hydroxy-carboxylic acid of the formula

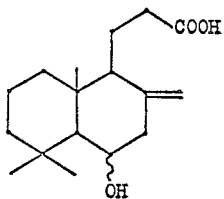

(X)

which, in turn, can be isomerised in the presence of an acid catalyst (for example, p-toluene-sulfonic acid in dioxan) into the hydroxy-lactone of the formula

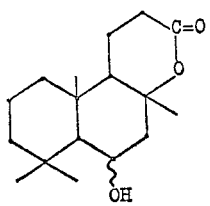

(XI)

The hydroxy-lactone XI obtained can be converted by treatment with a reducing agent such as lithium aluminum hydride into a triol of the formula

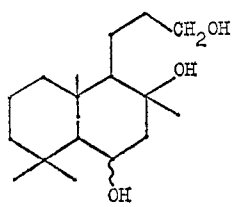

(XII)

from which a hydroxy-ether of the formula

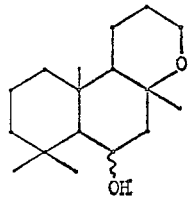

(XIII)

can be obtained by dehydration (e.g. with an acidic dehydration catalyst such as p-toluene-sulfonic acid).

The hydroxy ether XIII can also be obtained from the hydroxy-carboxylic acid X or an ester thereof (such as, for example, a lower-alkyl ester) by reduction with lithium aluminum hydride and acid cyclisation of the reduction product.

The introduction of a double bond into the 5,6-position of the 6-hydroxy compounds of Formulae VII and XIII with concomitant removal of the 6-hydroxy group can be carried out under the influence of dehydrating agents (e.g. p-tosyl halides). This yields the novel amber-type odorants of the Formulas XIV and XV.

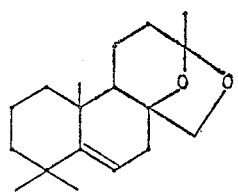   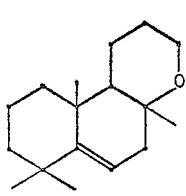

(XIV)         (XV)

It will be appreciated that Formula XIV includes the stereoisomers of the Formulas XIVa and XIVb.

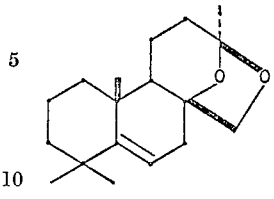   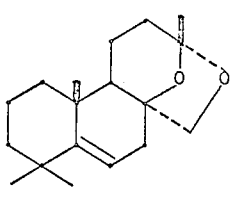

(XIVa)        (XIVb)

According to a further and additional step of the foregoing process, the novel amber-type odorant products are converted by catalytic hydrogenation into the further amber-type odorants in which the double bond in the 5,6-position is replaced by a single bond. These further amber-type odorants may be individually formulated thus

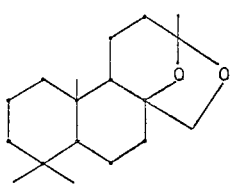   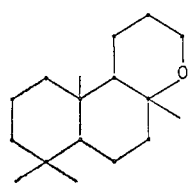

(XVI)         (XVII)

It will be appreciated that Formula XIV includes the stereoisomers shown in Formulas XVIa and XVIb.

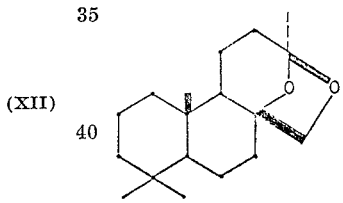   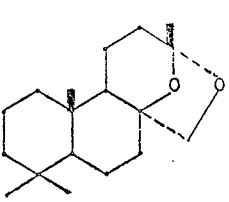

(XVIa)        (XVIb)

The following examples are illustrative of the invention. The temperatures are given in degrees centigrade.

EXAMPLE 1

(a) The turpentine oil was distilled from 1 kg. of larch turpentine and an ethereal solution of the residue was shaken with a 2% solution of sodium hydroxide to give 430 g. of a neutral portion which consisted essentially of larixyl acetate. On saponification there were obtained 403 g. of crude larixol from which 200 g. of crystalline larixol of melting point 103–104° could be isolated (besides 167 g. of a liquid product showing an identical IR-spectrum).

182 g. of potassium permanganate (5 atoms of oxygen) were added portionwise at 0°–2° with vigorous stirring during 8.5 hours to a solution of 105 g. of larixol in 5.1 litres of acetone. The mixture was left at room temperature for 40 hours after which time the manganese sludge was filtered off. The filtrate was evaporated to give 48 g. of an oil as the residue.

The manganese sludge was resuspended in 1.3 litres of ether and the suspension was shaken with a solution of 500 g. of sodium sulfite in 1.7 litres of 2 N sulfuric acid until the manganese all the dioxide was reduced. The ethereal solution obtained was combined with the 48 g. of oily residue and the mixture was washed six times with water, extracted three times using a total of 300 ml. of 2 N sodium hydroxide solution (upon acidification with mineral acid this extract yielded 10.8 g. of an acidic fraction), washed neutral with water and dried over sodium sulfate. The solvent was evaporated from the dried solution to give 68.5 g. of a neutral fraction.

65 g. of Girard reagent T and 58 ml. of glacial acetic acid were added to a solution of 68.5 g. of the neutral fraction in 470 ml. of absolute ethanol. The mixture was heated under reflux on the steam-bath for 1.5 hours, after which time the cooled mixture was poured into 3 litres of ice-water containing 47.1 g. of sodium hydroxide and worked up in the usual manner to give 35.8 g. of a non-ketonic fraction in the form of a yellowish oil and 16.3 g. of a ketonic fraction which was initially oily, but later crystallized. The methyl ketone VI hereinbefore was obtained in pure form from the ketonic fraction; melting point=87°–88° (from petroleum ether). The 2,4-dinitrophenyl hydrazone had a melting point of 159°–160°.

The non-ketonic fraction was chromatographed on silicagel to give ca. 6 g. of the internal ketal VIIa hereinbefore of melting point 141°–142° (from petroleum ether).

The same internal ketal was also obtained in the following manner.

1 g. of osmium tetroxide was added to a solution of 35.5 g. of larixol in 1 litre of dioxan and 325 ml. of 1 N sulfuric acid. After 10 minutes, 270 g. of sodium metaperiodate were added with stirring at room temperature in the course of 0.5 hour and the mixture was further stirred for 2–3 hours. After this time the mixture was treated with water up to solution of the salt. The oil (23 g.) which was obtained after extraction with ether and subsequent distillation was chromatographed on alumina and eluted with ether to yield the ketal VIIa of melting point 137.5° (after recrystallization from methanol and sublimation under reduced pressure). The ketal obtained in this manner was identical with that obtained by permanganate oxidation of larixol.

(b) 400 mg. of the internal ketal VIIa were heated under reflux with 285 mg. of p-toluene-sulfonyl chloride in 6 ml. of dry pyridine for 7 hours. After cooling, the mixture was poured into 10–12 times its volume of water. The mixture obtained was extracted five times with ether. The extract was shaken four times with 2 N sulfuric acid, then four times with saturated sodium bicarbonate solution, then washed neutral with water and dried over anhydrous sodium sulfate. On evaporation of the ether, the unsaturated ketal of formula XIVa hereinbefore crystallized in the form of colourless, shining leaflets of melting point 88°–90° (from 60% methanol); yield 377 mg. This ketal had a very lasting odour of the amber-type. (Sweet, woody, reminiscent of costus oil; useful for the compounding of animal and amber-like notes.)

(c) 200 mg. of the unsaturated ketal XIVa hereinbefore were dissolved in 50 ml. of isopropanol and hydrogenated for 10 hours in the stirring-autoclave at a temperature of ca. 200° and a pressure of 115 atmospheres in the presence of 700 mg. of Raney-nickel. The catalyst was then filtered off and the filtrate was poured into 500 ml. of water. The hydrogenation product precipitated in crystalline form. The suspension was extracted three times with ether, the ethereal solution was washed five times with water and dried over anhydrous sodium sulfate. On evaporation of the ether, the ketal of Formula XVIa hereinbefore crystallized spontaneously; melting point= 114°–115° (from 70% methanol).

EXAMPLE 2

(a) A solution of 25 g. of 3-chloro-perbenzoic acid (84%) in 250 ml. of ether was added over the course of 4 hours with stirring at room temperature to a solution of 30.6 g. of larixol in 600 ml. of ether. The mixture was allowed to stand overnight. After monitoring the consumption of peracid (1 molar equivalent) by titration with sodium thiosulfate, the ethereal solution was washed neutral and dried over sodium sulfate. The solvent was distilled off under reduced pressure to yield 30.1 g. of crude epoxide of Formula VIII hereinbefore in the form of a white powder of melting point ca. 50°; $[\alpha]_D = +35.0°$ (c.=1 in chloroform).

The epoxidation of larixol was also carried out with perbenzoic acid as follows:

A solution of 15.9 g. of perbenzoic acid in 270 ml. of chloroform was added in the course of 15 hours to a solution of 30.6 g. of larixol in 400 ml. of chloroform (containing 5 g. of sodium acetate in suspension) which was cooled to 5°. After working up as described hereinbefore there were obtained 33.7 g. of crude epoxide of Formula VIII; $[\alpha]_D = +31.0°$ (c.=1 in chloroform).

(b) 10 g. of crude epoxide in 60 ml. of carbon tetrachloride were ozonised at 0°. A solution of 2.4 g. of sodium bicarbonate in 115 ml. of water was then added, following which 350 ml. of methanol were added with stirring (the temperature not exceeding 26°). The carbon tetrachloride was distilled from the mixture and the solution obtained was allowed to stand at room temperature for 24 hours. After this time, methanol and water were removed by distillation under reduced pressure and the residue containing the oxido ketone IX was taken up in benzene. The benzene solution was washed with water and concentrated to a volume of 200 ml. 0.6 g. of p-toluene-sulfonic acid were added and the mixture was heated at reflux for 5 hours, then cooled and washed neutral. The solvent was distilled off and the yellow oil (5.2 g.) obtained was chromatographed on alumina. Approximately 1 g. of the ketal of Formula VIIb of melting point 132° was obtained by elution with ether. Recrystallization from petroleum ether raised the melting point to 138.5°.

(c) 0.5 g. of the ketal VIIb were dehydrated using 0.4 g. of p-toluene-sulfonyl chloride and 8.5 ml. of dry pyridine. Ca. 0.5 g. of crude, crystalline ketal of Formula XIVb were obtained. After sublimation and crystallization from aqueous methanol its melting point was 99°. Sweet, woody, amber-like odour; useful for the compounding of warm and heavy notes.

(d) 300 mg. of the unsaturated ketal XIVb were dissolved in 50 ml. isopropanol and hydrogenated under pressure at a temperature of ca. 200° in the presence of 500 mg. of Raney-nickel. After filtration of the catalyst and elimination of the solvent there was obtained an oil which crystallized upon standing. The so obtained saturated ketal XVIb melted at 119–121° (after sublimation in a high vacuum).

The ketal VIIb was also obtained from the hydroxy methylketon as follows:

(e) Excess chloroperbenzoic acid (84%) was added to a solution of 1.2 g. of compound VI (melting point 87–88°) in 100 ml. of ether. The consumption of the peracid (1,1 molar equivalents) was determined by titration. The reaction product was poured into water and then the ethereal solution was washed neutral. On evaporation of the solvent, the ketone IX was obtained in the form of an oil. Infrared spectrum: 1712 cm.$^{-1}$ (CO).

600 mg. of the oily ketone IX were heated under reflux with 100 mg. of paratoluene-sulfonic acid in 50 ml. of absolute benzene for 4 hours. After cooling, the solution was washed and evaporated to dryness. The resulting oil was chromatographed on alumina. The ketal VIIb of melting point 137–138° (from petroleum ether) was obtained by elution with ether.

The ketone IX was also obtained from the oxido diol VIII in the following manner:

(f) 30 mg. of osmium tetroxide were added to a solution of 730 mg. of oxido diol VIII (mixture of stereoisomers) in 20 ml. of dioxan and 5 ml. of water. The mixture was stirred for 15 minutes, after which time 3.1 g. of sodiumperiodate were added to the solution in small portions. After ca. 3 hours the mixture was extracted with ether to yield the ketone IX in the form of a dark oil. (Carbonyl band at 1715 cm.$^{-1}$.)

EXAMPLE 3

(a) The methyl ketone of Formula VI hereinbefore was obtained from larixol as described in Example 1.

A solution of 27.5 g. of potassium iodide and 13.8 g. of iodine in 110 ml. of water and a solution of 11 g. of potassium hydroxide in 110 ml. of water were simultaneously added during 1 hour with vigorous stirring at room temperature to 2 g. of the methyl ketone VI in 200 ml. of dioxan. The mixture was subsequently stirred for 4 hours and then worked up to give 1.1 g. of the unsaturated carboxylic acid of Formula X hereinbefore which were crystallized from 40% ethanol to give colourless needles of melting point 165°–158° C.

(b) 1.05 g. of the unsaturated carboxylic acid of Formula X were esterified with diazomethane to give 1.087 g. of the methyl ester in the form of an oil.

280 mg. of lithium aluminium hydride (2 mol per mol of ester) were heated at reflux with stirring in 20 ml. of absolute ether. 1.087 g. of the methyl ester were added dropwise in the course of 0.25 hour to the solution obtained and the mixture was held at reflux with stirring for 3.5 hours. 868 mg. of an unsaturated diol were thus obtained in the form of a viscous, colourless mass which crystallized overnight; melting point=91°–92° (from petroleum ether).

The same unsaturated diol could also be obtained from the unsaturated carboxylic acid of Formula X itself.

(c) 300 mg. of the unsaturated diol were dissolved in 300 ml. of absolute benzene, treated with 30 mg. of p-toluene-sulfonic acid and heated to boiling for 4 hours. The mixture was then extracted twice with 2 N sodium hydroxide solution, washed neutral with water and dried over sodium sulfate. 285 mg. of the cyclic ether of Formula XIII hereinbefore were thus obtained in the form of a viscous oil. Infrared spectrum: 3420, 1050 cm.$^{-1}$ (OH); 1365, 1385 cm.$^{-1}$ (geminal dimethyl grouping); 1090 cm.$^{-1}$ (—C—O—C—).

(d) 265 mg. (1 mmol) of the cyclic ether of Formula XIII were dissolved in 6 ml. of dry pyridine, 210 mg. (1.1 mmol) of p-toluene-sulfonyl chloride were added and the mixture was heated to boiling at reflux for 15 hours. 205 mg. of the unsaturated ether of Formula XV hereinbefore were thus obtained in the form of an oil. This unsaturated ether had amber odour with a dark note.

The unsaturated ether of Formula XV may be hydrogenated to give the ether of Formula XVII hereinbefore.

We claim:
1. The compound of the formula:

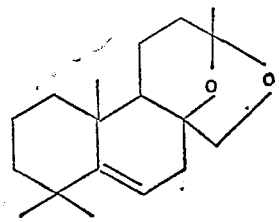

References Cited

UNITED STATES PATENTS 3,144,465    9/1964    Ruzicka et al. _____ 260—340.9

ALEX MAZEL, *Primary Examiner.*

JAMES H. TURNIPSEED, *Assistant Examiner.*

U.S. Cl. X.R.

260—343.2, 345.2, 348, 488, 514, 586, 617; 252—522